United States Patent Office

2,910,471
Patented Oct. 27, 1959

2,910,471

PROCESS FOR THE PREPARATION OF 9α-CHLORO- AND 9α-BROMO-11-OXO-5α-STEROIDS

Ewart Ray Herbert Jones, Oxford, and Harold Bernard Henbest, Manchester, England, assignors to Glaxo Laboratories Limited, Greenford, England, a British company No Drawing. Application May 7, 1956
Serial No. 582,943

Claims priority, application Great Britain May 9, 1955

13 Claims. (Cl. 260—239.55)

The present invention is concerned with improvements in or relating to the preparation of 9α-chloro- and 9α-bromo-11-oxo-5α-steroids, to certain new compounds of this type and to the conversion of the compounds thus prepared to 9β:11β-epoxy-5α-steroids.

The discovery of the enhanced biological activity of 9α-halogen substituted cortisone and cortisol (Liddle et al., Science, 1954, 120, 496) has led to an increased interest in the preparation of such compounds and in the halogenation of 11-oxo-5α-steroids in the 9-position. The 9α-halogeno derivatives of cortisone and cortisol have been prepared by Fried and Sabo (J. Amer. Chem. Soc., 1953, 75, 2273; ibid, 1954, 76, 1455), by a multi-stage process involving at least four stages, starting from the corresponding 11-oxo compounds. Direct bromination of 11-oxo-5β-steroids gives rise to 12-bromo ketones (see Turner et al., J. Biol. Chem., 1944, 116, 345).

We have now found that 9α-chloro- and 9α-bromo-11-oxo-5α-steroids can be readily obtained in good yield by the direct chlorination or bromination of the corresponding 11-oxo-5α-steroids, in an inert solvent, such as acetic acid or chloroform, in the presence of a strong acid catalyst such as, for example, the corresponding hydrogen halide. We find, however, that higher yields and more consistent results can be obtained if such halogenation is carried out in an atmosphere of an inert gas, such as nitrogen, and in the absence of light and peroxides.

According to the present invention, therefore, we provide a process for the preparation of 9α-chloro- and 9α-bromo-11-oxo-5α-steroids in which an 11-oxo-5α-steroid is halogenated in an inert solvent with chlorine or bromine in the presence of a strong acid catalyst such as, for example, hydrogen chloride or hydrogen bromide.

According to a feature of the present invention, the halogenation is carried out in an inert atmosphere and with the exclusion of light and peroxides.

Any convenient inert solvent or mixture of solvents may be used in the process according to the invention and suitable solvents are, for example, acetic acid, dioxan, methylene chloride and chloroform. We prefer to carry out the halogenation at a temperature within the range of from 0° to 50° C. Where the starting material contains other centres susceptible to halogenation, polyhalogenation will occur but this will not affect halogenation at the 9-position so long as sufficient chlorine or bromine is used to substitute in all the available positions. Where halogenation only takes place at the 9-position, we prefer to use from 1–1.5 mols of chlorine or bromine, advantageously 1.1 mols, per mol of steroid starting material. Hydrogen chloride is preferably used to catalyse the chlorination reaction, whilst hydrogen bromide is preferably used to catalyse the bromination.

The 9α-chloro and 9α-bromo-11-oxo-5α-steroids which may be prepared by the process according to the invention are new compounds. A group of steroids which are new and which are useful in the preparation of compounds having cortisone-like activity are those having a 3β-hydroxy or -acyloxy group, a 5α-hydrogen atom, a 9α-chlorine or bromine atom and an 11-oxo group and which are saturated in all rings, e.g., 9α-bromo-3β:17α:21-trihydroxy-5α-pregnan-11:20-dione and its esters, particularly its 21-monoacetate and 3β:21-diacetate.

In order that the invention may be well understood we now give the physical characteristics of two specific preferred new compounds.

3β:21-diacetoxy - 9α - bromo - 17α - hydroxy - 5α-pregnan-11:20-dione, M.P. 190–192° C., $[\alpha]_D + 160°$ (c., 0.8 in chloroform).

21 - acetoxy - 9α - bromo - 3β:17α - dihydroxy -5α-pregnan-11:20-dione, M.P. 180–186° C. (decomp.), $[\alpha]_D + 195°$ (c., 1.3; chloroform).

These compounds are useful in the synthesis of 9α-halogeno analogues of cortisone and cortisol.

It should be understood that the characteristics quoted above were shown by the purest material we have been able to prepare and may be liable to variation dependent on the purity of any particular sample of the compounds in question.

The process herein described for the preparation of 9α-chloro- and 9α-bromo-11-oxo-5α-steroids by the direct halogenation of 11-oxo-5α-steroids, is not conveniently applicable to the introduction of other halogen atoms at the 9-position. In order to form the corresponding fluoro- and iodo-steroids it is necessary to proceed via the corresponding 9β:11β-epoxy-5α-steroids, the preparation of which and the use of which to obtain the desired 9-fluoro- and iodo-steroids has been described by Fried and Sabo (loc. cit.). 9β:11β-epoxy-5α-steroids are thus important intermediates in the production of 9-fluoro- and iodo-11-oxo-5α-steroids.

We have found that the preparation of 9β:11β-epoxy-5α-steroids can be greatly simplified and that such compounds can be obtained in satisfactory yields by treating the 9α-bromo-11-oxo-5α-steroids the subject of this invention with a metallic hydride, particularly lithium aluminium hydride or lithium borohydride, in the presence of an inert solvent therefor. Thus an 11-oxo-5α-steroid may be converted into the corresponding 9β:11β-epoxy-5α-steroid in two stages as compared with the four stages required by the process described by Fried and Sabo (loc. cit.).

According to a further feature of the present invention, therefore, we provide a process for the preparation of 9β:11β-epoxy-5α-steroids in which a 9α-bromo-11-oxo-5α-steroid is treated with a metallic hydride in the presence of a suitable inert solvent.

Suitable inert solvents for use in this feature of the invention are those in which both the steroid starting material and the metallic hydride used, are soluble. It will be appreciated that in view of this consideration only those metallic hydrides which are soluble in an inert solvent in which the steroid starting material is soluble, can be used in the process according to the invention. In the case of lithium aluminium hydride and lithium borohydride, diethyl ether and tetrahydrofuran are particularly suitable solvents.

We prefer that the quantity of metallic hydride used should not be more than approximately 10% in excess of the theoretical quantity, as reduction of the epoxide may take place if more than this quantity is used. The treatment with the metallic hydride is preferably carried out at a temperature in the range of from 0°–80° C., and is conveniently carried out at elevated temperatures, for example, at the boiling point of the solvent used.

Where other reducible groups, in addition to the 9α-bromo- and 11-oxo-groups, are present in the starting material, these will normally be reduced in the process according to the invention; thus compounds containing aldehydic or ketonic functions (in addition to the 11-oxo-group) will normally be reduced to the corresponding hydroxy compounds. In such cases a larger quantity of metallic hydride must be used than where no such additional reducible groups are present. The amount of metallic hydride to be used in any particular case may readily be determined by a preliminary test.

In order that the invention may be well understood, the following examples are given by way of illustration only:

EXAMPLE 1

3β-acetoxy-9α-bromoergostan-11-one

A solution of 3β-acetoxyergostan-11-one (2.8 g.) in acetic acid (18 cc.) was treated successively with hydrobromic acid (50% in acetic acid; 5 drops) and bromine (0.323 cc.; 1.1 mols) in acetic acid (3.2 cc.), whereupon the solution was heated at 40° C. until the bromine colour was discharged. These operations were performed with nitrogen bubbling through the solution and the reaction vessel shielded from light. Much of the bromo-compound crystallised on cooling the reaction mixture, but the total product was isolated via ether. Crystallisation from methanol-acetone gave a fairly pure product (3.05 g.); further crystallisation afforded the pure bromoketone as plates, M.P. 161–163° C., $[\alpha]_D$ +128°. (Found: C, 66.95; H, 9.4; Br, 14.6. $C_{30}H_{49}O_3Br$ requires C, 67.0; H, 9.25; Br, 14.9%.) Infra-red spectrum (in $CS_2$): peaks at 1735, 1245 (acetate) and 1710 (11-ketone) cm.$^{-1}$.

EXAMPLE 2

3β - acetoxy - 17α - hydroxy - 9:21 - dibromo - 5α - pregnane - 11:20 - dione 3β - acetoxy - 17α - hydroxy - 5α - pregnane - 11:20 - dione (500 mg.) in dry ether (50 cc.) was treated with bromine (430 mg.; 2.4 mols) in acetic acid (4.4 cc.) and hydrogen bromide in acetic acid (50%; 0.2 cc.) for 1.75 hr. in the dark and under nitrogen. The ethereal solution was washed with sodium bicarbonate, water and the solvent removed. The white solid (600 mg.) was crystallised from methanol to give 3β - acetoxy - 17α - hydroxy - 9:21 - dibromo - 5α - pregnane - 11:20 - dione as needles, M.P. 213–215° C., $[\alpha]_D$ +160° (c., 0.785). (Found: C, 50.25; H, 5.93. $C_{23}H_{32}Br_2O_5$ requires C, 50.3; H, 5.9%.) Yield 530 mg., 75%.

EXAMPLE 3

3β:21 - diacetoxy - 17α - hydroxy - 9 - bromo - 5α - pregnane - 11:20 - dione The dibromide obtained in Example 2 (300 mg.) in acetone (40 ml.) was treated with sodium iodide (500 mg.) for 0.5 hr. The solution was diluted with water and extracted with ether. The product so obtained was refluxed for 8 hours with potassium bicarbonate (7.5 g.) and acetic acid (3 cc.) in acetone (40 cc.). The product was worked up in the normal manner via ether and crystallised from acetone-methanol to give 3β:21 - diacetoxy - 17α - hydroxy - 9 - bromo - 5α - pregnane - 11:20 - dione as needles (220 mg.; 75%), M.P. 189–192° C. On further crystallisation, M.P. 190–192° C., $[\alpha]_D$ +160° (c., 0.8 in CHCl$_3$). (Found: C, 56.6; H, 6.9; $C_{25}H_{35}O_7Br$ requires C, 56.85; H, 6.7%.)

EXAMPLE 4

21 - acetoxy - 9α - bromo - 3β:17α - dihydroxy - 5α - pregnane - 11:20 - dione 21 - acetoxy - 3β:17α - dihydroxy - 5α - pregnane - 11:20 - dione (4.872 g.) in chloroform (45 ml.; previously stored over anhydrous calcium chloride) and dioxan (140 ml.) was treated at room temperature with 5 N-hydrogen bromide in acetic acid (3 drops) and bromine (2.03 g.) in chloroform (14.9 ml.; purified as above). The bromine was taken up in a few minutes and the rotation did not change after 10 minutes. The reaction mixture was poured into water and the steroidal product (7.0 g.), $[\alpha]_D$ +187°, isolated by means of chloroform (in which it was washed with sodium hydrogen carbonate and water). Four crystallisations of this material from acetone-methanol gave 21 - acetoxy - 9α - bromo - 3β:17α - dihydroxy - 5α - pregnane - 11:20 - dione (2.6 g.), M.P. 180–186° C. (decomp.) (after sintering at 140° C.), $[\alpha]_D^{20}$ +195° (c., 1.3; CHCl$_3$). (Found: C, 56.7; H, 6.8. $C_{23}H_{33}O_6Br$ requires C, 56.9; H, 6.85%.)

Oxidation of this material (0.5 g.) at 10 to 25° C. with chromic oxide solution [0.26 ml., made from chromic oxide (26.7 g.) in conc. sulphuric acid (23 ml.) and water (40 ml.) and diluted with water to 100 ml.] gave 4:5α-dihydro-9α-bromocortisone acetate (0.20 g.), M.P. 202–204° C., $[\alpha]_D^{20}$ +203° (c., 0.74; CHCl$_3$).

EXAMPLE 5

21-acetoxy-9α-chloro-3β:17α-dihydroxy-5α-pregnane-11:20-dione

21 - acetoxy - 3β:17α - dihydroxy - 5α - pregnane-11:20-dione (2.03 g.) in acetic acid (200 mls.) was treated with chlorine (1.42 g.) in carbon tetrachloride (16.4 mls.) and left for 18 hours at room temperature. Addition of water and isolation of the product by extraction with chloroform (in which it was washed with potassium iodide, sodium thiosulphate and sodium hydrogen carbonate solutions) gave, after evaporation of the solvent and chromatography on magnesium trisilicate, a crude product (0.42 g.). Recrystallisation from ethanol gave the chloro-steroid, M.P. 241–245° C. (decomp.), $[\alpha]_D^{20}$ +195° (c., 0.4 dioxan). (Found: Cl, 14.35, $C_{23}H_{32}O_6Cl_2$ requires Cl, 14.9%.)

In this example the necessary strong acid catalyst, in this case hydrogen chloride, is of course generated in situ by reaction of the chlorine with the acetic acid present.

EXAMPLE 6

3β-acetoxy-9α-chloroergostane-11-one

Chlorination of 3β-acetoxy-ergostan-11-one in carbon tetrachloride under the conditions described in the preceding example gave the chloro-ketone, M.P. 161–163° C., $[\alpha]_D^{20}$ +100° (c., 0.61, chloroform). (Found: Cl, 8.6, $C_{30}H_{49}O_3Cl$ requires Cl, 7.2%.)

EXAMPLE 7

3β-acetoxy-9β:11β-epoxyergostane

An ether solution (20 cc.) of 3β-acetoxy-9α-bromo-ergostan-11-one (376 mg.) and lithium aluminium hydride (22 mg.; 0.83 mol) was heated under reflux for 1 hour. The product was isolated with ether, and since the treatment with lithium aluminium hydride had hydrolysed the 3β-acetoxy group of the starting material, the product was re-acetylated in order to facilitate isolation, and then chromatographed on deactivated alumina (30 g.). Elution with light petroleum benzene (10.1) gave 3β-acetoxy-9β:11β-epoxy-ergostane (150 mg.), M.P. 114–115° C. (from acetone-methanol), $[\alpha]_D$ +23°. (Found: C, 78.35; H, 11.05. $C_{30}H_{50}O_3$ requires C, 78.55; H, 12.0%.) Infra-red spectrum: no hydroxyl band.

Although in the foregoing examples we have only shown the preparation of acetyloxy compounds it will be understood that the invention is also applicable to the preparation of other compounds of the series such as the propionyloxy, butyloxy, phenylacetyloxy and benzoyloxy compounds.

We claim:

1. A process for preparing a 9α-halogeno derivative selected from the group consisting of 9α-chloro and 9α-bromo derivatives of a steroid compound selected from the group consisting of

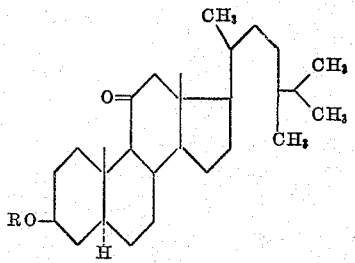

and

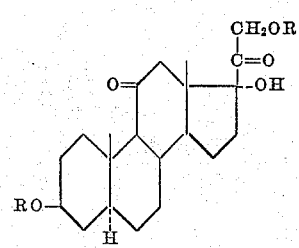

wherein R is selected from the group consisting of hydrogen and an acyl group derived from a carboxylic acid selected from the group consisting of lower alkanoic, phenylacetic and benzoic acids, which process comprises halogenating said steroid compound in an inert solvent with a halogen selected from the group consisting of chlorine and bromine in the presence of a strong acid catalyst selected from the group consisting of hydrogen chloride and hydrogen bromide.

2. A process as claimed in claim 1 wherein the halogenation is carried out in an inert atmosphere in the absence of light and peroxides.

3. A process as claimed in claim 1 wherein the inert solvent is selected from the group consisting of acetic acid, methylene chloride, chloroform and dioxan.

4. A process as claimed in claim 1 wherein the reaction is carried out at a temperature within the range of 0° to 50° C.

5. A process as claimed in claim 1 wherein sufficient of said halogen is used to substitute all the available positions of the steroid starting material.

6. A process as claimed in claim 1 wherein halogenation only takes place at the 9-position and from 1 to 1.5 mols of halogen are used per mol of steroid starting material.

7. A process as claimed in claim 6 wherein 1.1 mols of halogen are used per mol of steroid starting material.

8. A process for preparing a 9β:11β-epoxy derivative of a steroid compound selected from the group consisting of

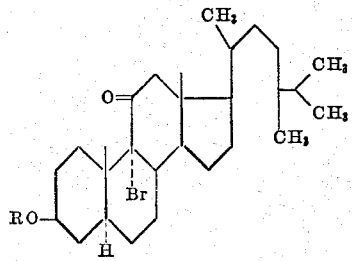

and

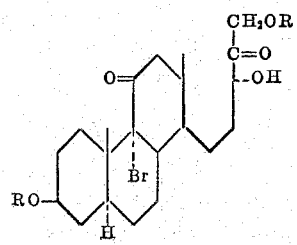

wherein R is selected from the group consisting of hydrogen and an acyl group derived from a carboxylic acid selected from the group consisting of lower alkanoic, phenylacetic and benzoic acids, which process comprises contacting said steroid with a metallic hydride selected from the group consisting of lithium aluminum hydride and lithium borohydride in an inert solvent for said steroid compound and said metallic hydride to reduce the 9α-bromo group and the 11-keto group and produce said 9β:11β-epoxy derivative.

9. A process as claimed in claim 8 wherein the inert solvent is selected from the group consiting of diethyl ether and tetrahydrofuran.

10. A process as claimed in claim 8 wherein the metallic hydride is used in an amount not more than approximately 10% in excess of the theoretical quantity.

11. A process as claimed in claim 8 wherein the treatment with the metallic hydride is carried out at a temperature within the range of from 0° to 80° C.

12. A process as claimed in claim 11 wherein the treatment is carried out at the boiling point of the solvent used.

13. The process for preparing a 9β:11β-epoxy derivative of a steroid compound selected from the group consisting of

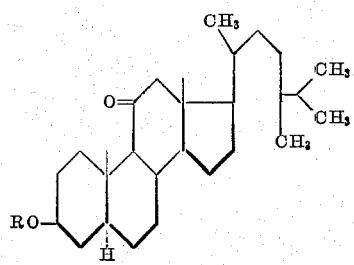

and

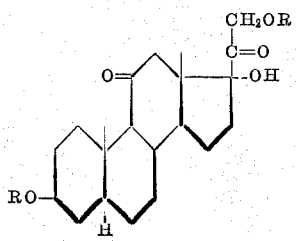

wherein R is selected from the group consisting of hydrogen and an acyl group derived from a carboxylic acid selected from the group consisting of lower alkanoic, phenylacetic and benzoic acids, which process comprises brominating said steroid compound in an inert solvent with bromine in the presence of a strong acid catalyst selected from the group consisting of hydrogen chloride and hydrogen bromide to produce the 9α-bromo derivative of said steroid compound, and contacting said 9α-bromo derivative with a metallic hydride selected from the group consisting of lithium aluminum hydride and lithium borohydride in an inert solvent for said 9α-bromo derivative and said metallic hydride to reduce the 9α-bromo group and the 11-keto group and produce said 9β:11β-epoxy derivative.

References Cited in the file of this patent

UNITED STATES PATENTS

| | | |
|---|---|---|
| 2,683,712 | Hogg | July 13, 1954 |
| 2,705,711 | Dodson | Apr. 5, 1955 |
| 2,732,385 | Krsek | Jan. 24, 1956 |
| 2,736,734 | Sarett | Feb. 28, 1956 |
| 2,763,671 | Fried et al. | Sept. 18, 1956 |
| 2,783,226 | Gould et al. | Feb. 26, 1957 |
| 2,838,493 | Graber et al. | June 10, 1958 |